US012216536B2

(12) United States Patent
Kannan et al.

(10) Patent No.: US 12,216,536 B2
(45) Date of Patent: **\*Feb. 4, 2025**

(54) LOW-OVERHEAD, BIDIRECTIONAL ERROR CHECKING FOR A SERIAL PERIPHERAL INTERFACE

(71) Applicant: Waymo LLC, Mountain View, CA (US)

(72) Inventors: Kaushik Kannan, Mountain View, CA (US); David Sobel, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,754

(22) Filed: Nov. 17, 2023

(65) Prior Publication Data

US 2024/0086278 A1    Mar. 14, 2024

Related U.S. Application Data

(63) Continuation of application No. 17/542,906, filed on Dec. 6, 2021, now Pat. No. 11,860,730.

(51) Int. Cl.
*G06F 11/10*   (2006.01)
*G06F 11/07*   (2006.01)
(Continued)

(52) U.S. Cl.
CPC ...... *G06F 11/1004* (2013.01); *G06F 11/0772* (2013.01); *G06F 11/3031* (2013.01); *G06F 13/4291* (2013.01)

(58) Field of Classification Search
None
See application file for complete search history.

(56) References Cited

U.S. PATENT DOCUMENTS 8,516,174 B2   8/2013   Goerlich et al.
9,172,565 B2   10/2015  Cadugan et al.
(Continued)

FOREIGN PATENT DOCUMENTS

CN    100490002 C    5/2009
CN    202022205 U    11/2011
(Continued)

OTHER PUBLICATIONS

"Automotive LiDAR Collision-Avoidance System"; Megha Agarwal; Honors College Thesis; University of Arizona (May 2017).
(Continued)

*Primary Examiner* — April Y Blair
*Assistant Examiner* — Matthew W Wahlin
(74) *Attorney, Agent, or Firm* — McDonnell Boehnen Hulbert & Berghoff LLP

(57) ABSTRACT

Example embodiments relate to low-overhead, bidirectional error checking for a serial peripheral interface. An example device includes an integrated circuit. The device also includes a serial peripheral interface (SPI) with a Master In Slave Out (MISO) channel and a Master Out Slave In (MOSI) channel. The MOSI channel is configured to receive a write address, payload data, and a forward error-checking code usable to identify data corruption within the write address or the payload data. The integrated circuit is configured to calculate and provide a reverse error-checking code usable to identify data corruption within the write address or the payload data. Additionally, the integrated circuit is configured to compare the forward error-checking code to the reverse error-checking code. Further, the integrated circuit is configured to write, to the write address if the forward error-checking code matches the reverse error-checking code, the payload data.

20 Claims, 12 Drawing Sheets

(51) Int. Cl.
  *G06F 11/30* (2006.01)
  *G06F 13/42* (2006.01)

(56) References Cited

U.S. PATENT DOCUMENTS

| | | | |
|---|---|---|---|
| 9,378,076 | B2 | 6/2016 | Park et al. |
| 10,649,945 | B1 | 5/2020 | Geerling et al. |
| 10,797,698 | B1 | 10/2020 | Droz et al. |
| 10,884,972 | B2 | 1/2021 | Kessler et al. |
| 10,929,333 | B2 | 2/2021 | Zander et al. |
| 2019/0258539 | A1 | 8/2019 | Zhu et al. |
| 2020/0356521 | A1* | 11/2020 | Kessler ............... G06F 13/4291 |
| 2020/0371977 | A1 | 11/2020 | Sangolli et al. |
| 2021/0279125 | A1 | 9/2021 | Leisenheimer et al. |
| 2021/0296783 | A1 | 9/2021 | Rostomyan |

FOREIGN PATENT DOCUMENTS

| | | | | |
|---|---|---|---|---|
| CN | 102768650 | A | 11/2012 | |
| CN | 102928846 | A | 2/2013 | |
| CN | 102928846 | B | 7/2014 | |
| CN | 103902485 | A | 7/2014 | |
| CN | 102768650 | B | 6/2015 | |
| CN | 212847008 | U | 3/2021 | |
| CN | 112904353 | A | 6/2021 | |
| DE | 102013112989 | A1 * | 6/2014 | ............... H04L 1/18 |
| DE | 102007028767 | B4 * | 1/2016 | ............ H03M 13/09 |
| JP | 2019016909 | A | 1/2019 | |
| KR | 10-1637998 | B1 | 7/2016 | |
| WO | 2020148746 | A1 | 7/2020 | |

OTHER PUBLICATIONS

"Implementation of Low Complex and High Secured SPI Communication System for Multipurpose Applications"; M. Jyothi, et al.; International Journal of Computer Science and Information Technologies, vol. 3 (1), pp. 3214-3219 (2012).

"Common CRC parameters"—(pycrc.org)—(Aug. 18, 2015). (Year: 2015).

* cited by examiner

LOW-OVERHEAD, BIDIRECTIONAL ERROR CHECKING FOR A SERIAL PERIPHERAL INTERFACE

CROSS-REFERENCE TO RELATED APPLICATIONS

The present application is a continuation of U.S. patent application Ser. No. 17/542,906 filed on Dec. 6, 2021, the contents of which are hereby incorporated by reference.

BACKGROUND

Unless otherwise indicated herein, the description in this section is not prior art to the claims in this application and is not admitted to be prior art by inclusion in this section.

Autonomous vehicles, semi-autonomous vehicles, vehicles operating in an autonomous mode, and/or vehicles operating in a semi-autonomous mode may use various sensors to detect their surroundings. For example, light detection and ranging (lidar) devices, radio detection and ranging (radar) devices, and/or cameras may be used to identify objects in environments surrounding autonomous or semi-autonomous vehicles. Such sensors may be used in object detection and avoidance and/or in navigation, for example.

SUMMARY

This disclosure relates to low-overhead, bidirectional error checking for a serial peripheral interface (SPI). SPIs described herein may include an SPI controller and an SPI subcontroller that communicate payload data with one another over the SPI. In addition to communicating payload data, the SPI controller and the SPI subcontroller may communicate error-checking codes to one another. These error-checking codes may be used to ensure that a communication error (e.g., data corruption, etc.) has not occurred. Further, the error-checking codes may be calculated/communicated in tandem with other tasks being performed by the SPI controller and/or SPI subcontroller. As such, the calculation/communication of error-checking codes may not substantially slow down the process of reading/writing payload data. Additionally, by communicating the error-checking codes bidirectionally, the SPI subcontroller may refrain from executing instructions which were miscommunicated and/or the SPI controller may be alerted as to when instructions were not properly received by the SPI subcontroller. This can be particularly beneficial for certain SPI applications, such as when a lidar device has a central computing device (SPI controller) communicating with a laser driver (SPI subcontroller).

In one aspect, a device is provided. The device includes an integrated circuit. The device also includes a serial peripheral interface (SPI) communicatively coupled to the integrated circuit. The SPI includes a Master In Slave Out (MISO) channel and a Master Out Slave In (MOSI) channel. The MOSI channel is configured to receive a write address to be written to within the integrated circuit. The device is also configured to receive payload data to be written. In addition, the device is configured to receive a forward error-checking code usable to identify data corruption within the write address or the payload data. Further, the integrated circuit is configured to calculate a reverse error-checking code based on the received write address and payload data. The reverse error-checking code is usable to identify data corruption within the write address or the payload data. Additionally, the device is configured to provide, at the MISO channel, the calculated reverse error-checking code. Still further, the integrated circuit is configured to compare the forward error-checking code to the reverse error-checking code. Even further, the device is configured to write, to the write address if the forward error-checking code matches the reverse error-checking code, the payload data.

In another aspect, a method is provided. The method includes receiving, by a Master Out Slave In (MOSI) channel of a serial peripheral interface (SPI) of a subcontroller, a write address to be written to within an integrated circuit of the subcontroller. The method also includes receiving, by the MOSI channel, payload data to be written. In addition, the method includes receiving, by the MOSI channel, a forward error-checking code usable to identify data corruption within the write address or the payload data. Further, the method includes calculating, by the integrated circuit, a reverse error-checking code based on the received write address and payload data. The reverse error-checking code is usable to identify data corruption within the write address or the payload data. In addition, the method includes providing, to a Master In Slave Out (MISO) channel of the SPI by the integrated circuit, the calculated reverse error-checking code. Still further, the method includes comparing, by the integrated circuit, the forward error-checking code to the reverse error-checking code. Yet further, the method includes writing, to the write address by the integrated circuit if the forward error-checking code matches the reverse error-checking code, the payload data.

In yet another aspect, a system is provided. The system includes a controller. The system also includes a subcontroller that includes an integrated circuit. The subcontroller and the controller are communicatively coupled over a serial peripheral interface (SPI) that includes a Master In Slave Out (MISO) channel and a Master Out Slave In (MOSI) channel. The MOSI channel is configured to receive a write address to be written to within the integrated circuit. The MOSI channel is also configured to receive payload data to be written. Additionally, the MOSI channel is configured to receive a forward error-checking code usable to identify data corruption within the write address or the payload data. Further, the integrated circuit is configured to calculate a reverse error-checking code based on the received write address and payload data. The reverse error-checking code is usable to identify data corruption within the write address or the payload data. In addition, the integrated circuit is configured to provide, to the MISO channel, the calculated reverse error-checking code. Still further, the integrated circuit is configured to compare the forward error-checking code to the reverse error-checking code. Even further, the integrated circuit is configured to write, to the write address if the forward error-checking code matches the reverse error-checking code, the payload data.

While example embodiments described herein may be described using SPIs, it is understood that other embodiments are also possible and are contemplated herein. For example, parallel communication interfaces may also implement one or more of the bidirectional error-checking strategies described herein.

These as well as other aspects, advantages, and alternatives will become apparent to those of ordinary skill in the art by reading the following detailed description, with reference, where appropriate, to the accompanying drawings.

DETAILED DESCRIPTION

Figure 1:
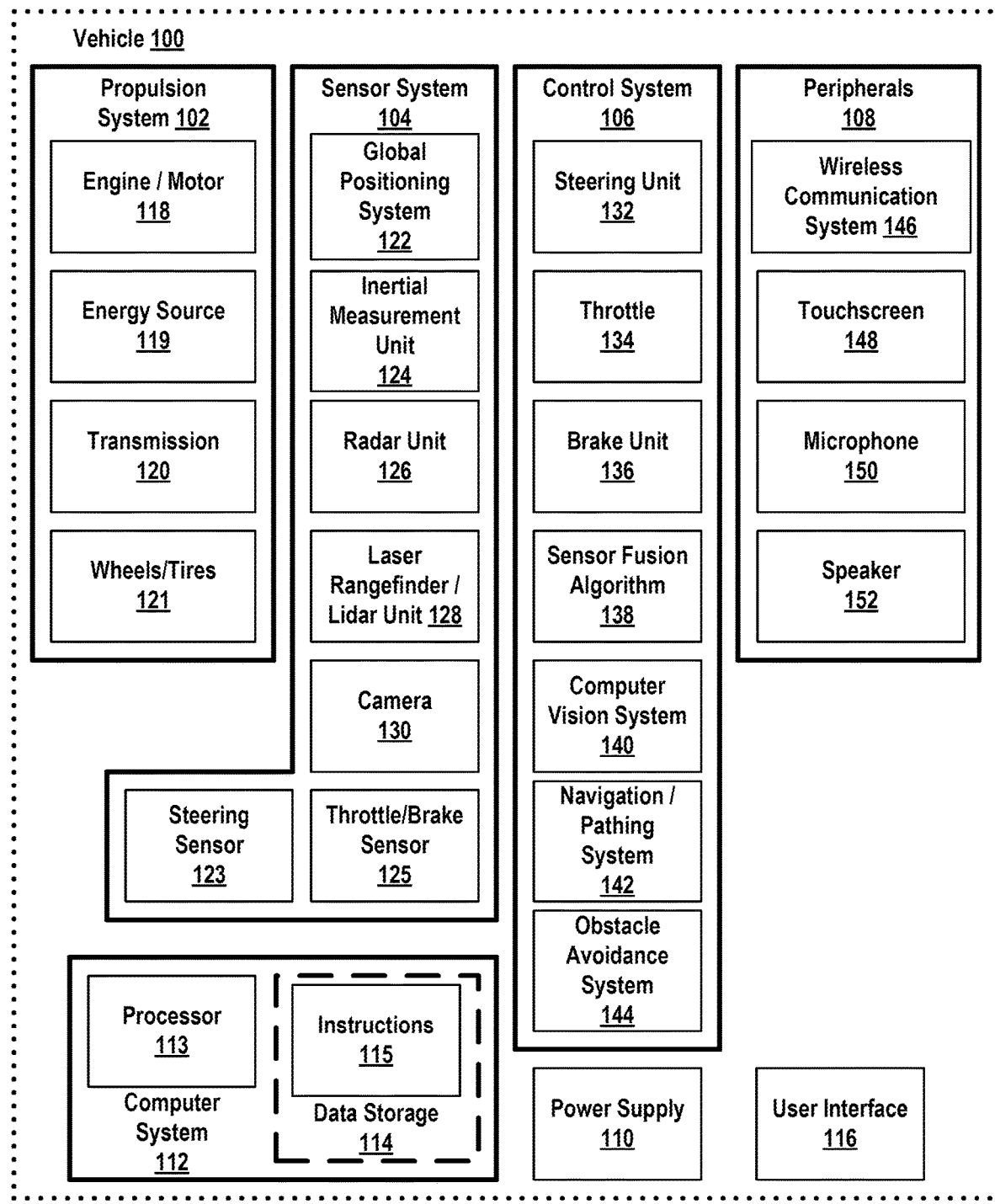
FIG. 1 is a functional block diagram illustrating a vehicle, according to example embodiments.
Figure 2A:
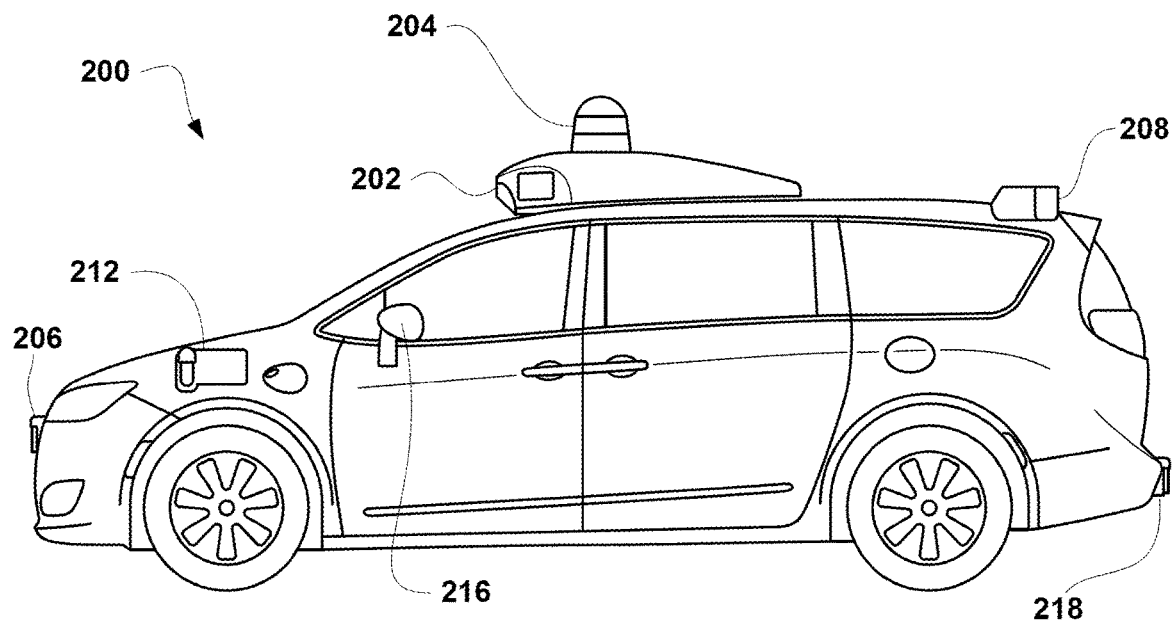
FIG. 2A is an illustration of a physical configuration of a vehicle, according to example embodiments.
Figure 2B:
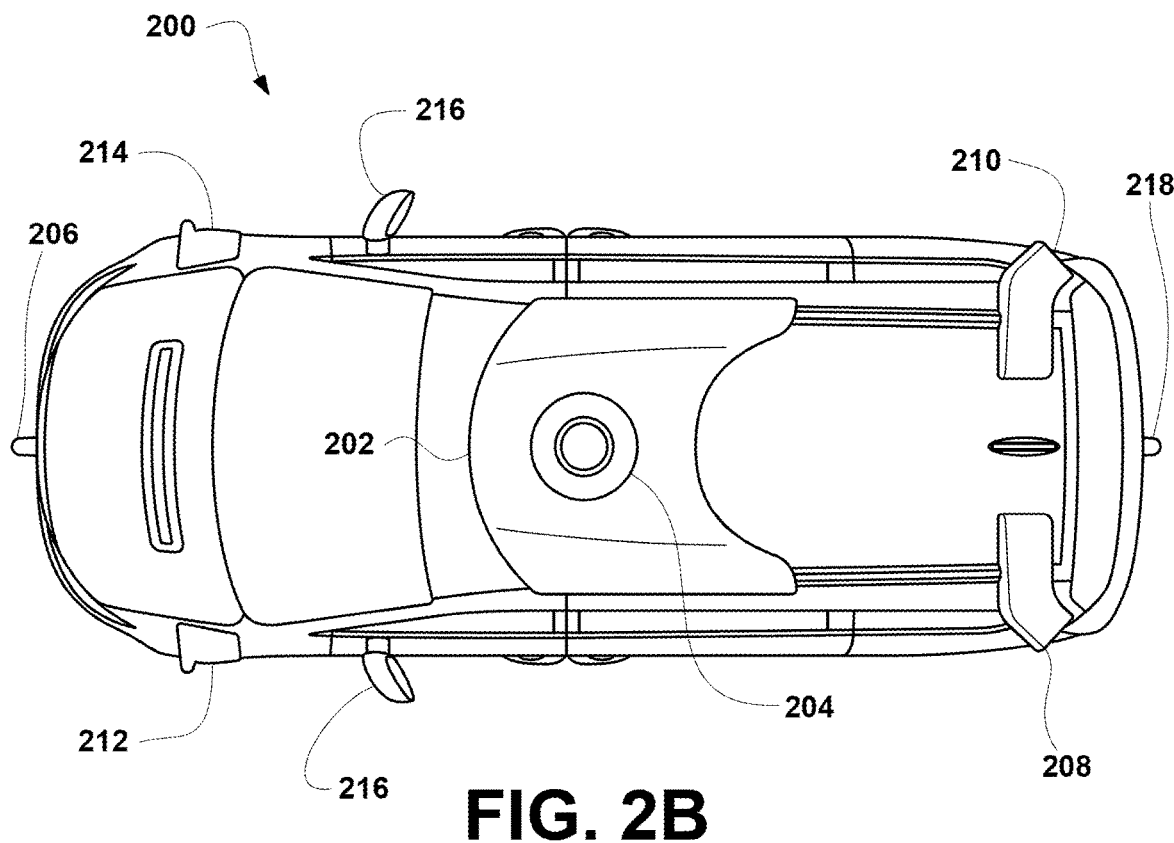
FIG. 2B is an illustration of a physical configuration of a vehicle, according to example embodiments.
Figure 2C:
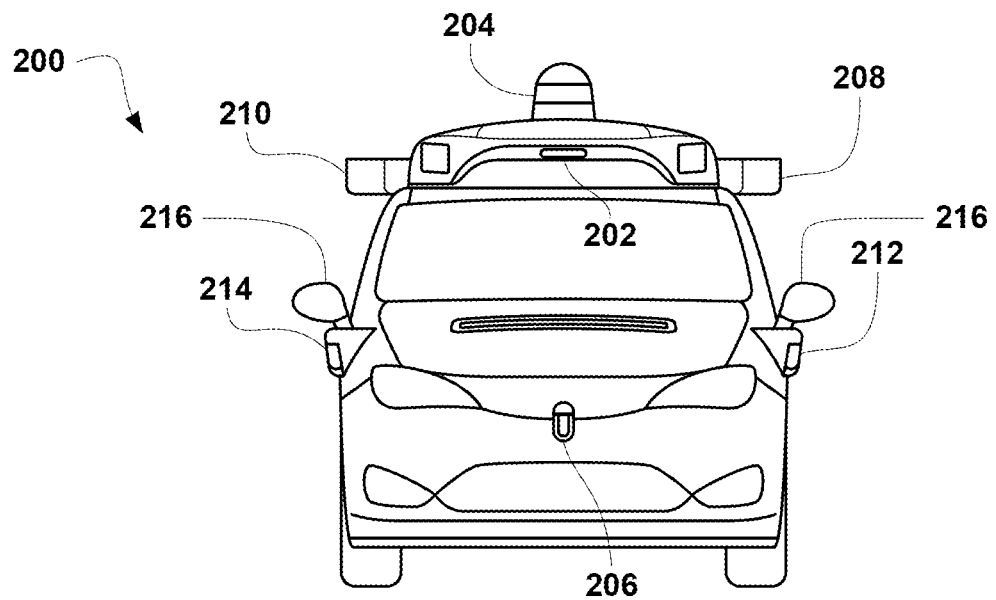
FIG. 2C is an illustration of a physical configuration of a vehicle, according to example embodiments.
Figure 2D:
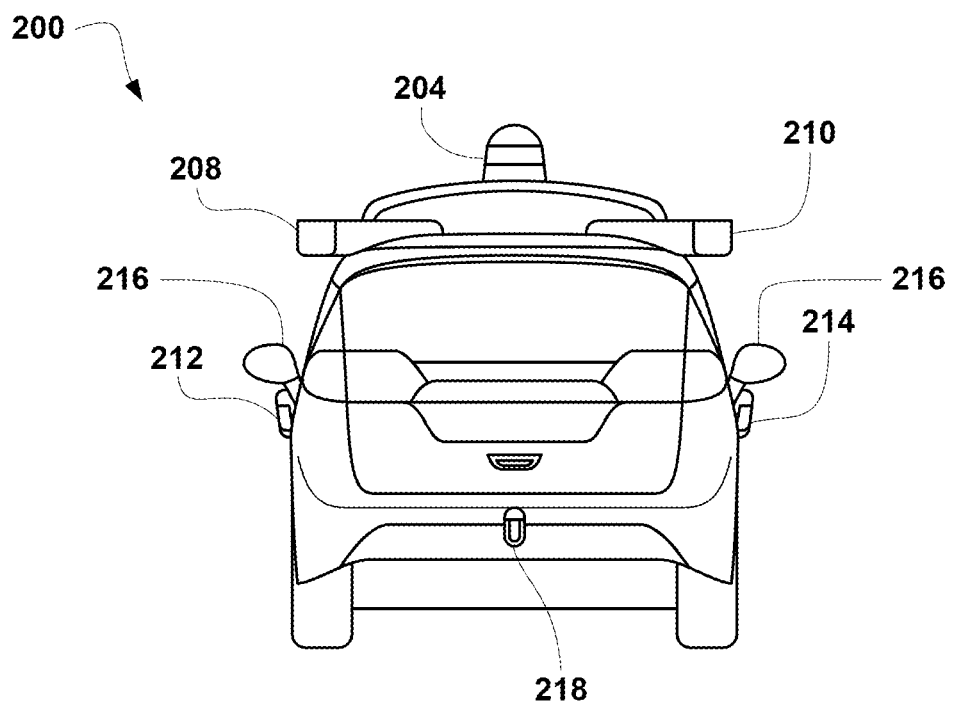
FIG. 2D is an illustration of a physical configuration of a vehicle, according to example embodiments.
Figure 2E:
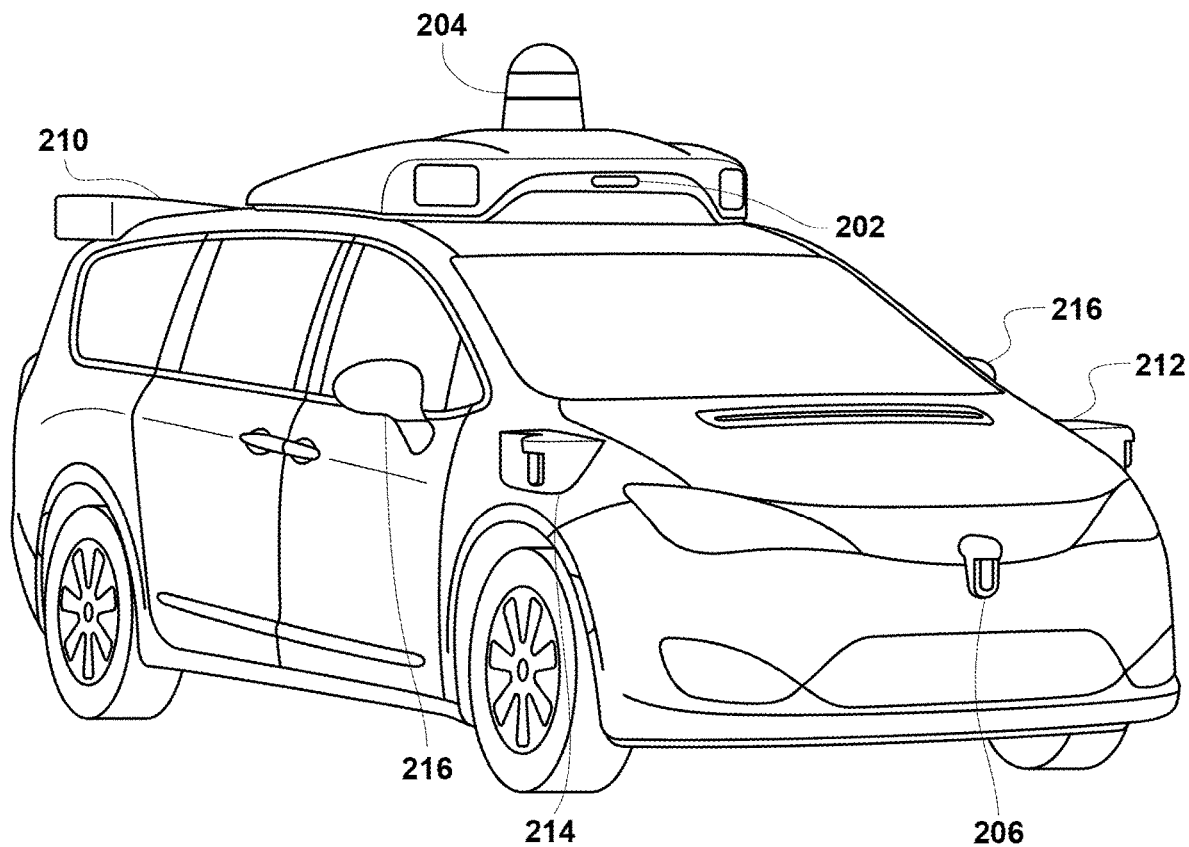
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Throughout this disclosure, SPI interactions are described. In describing these interactions, the terms "controller" and "subcontroller" are used. In general, the term "controller" is used herein when describing SPI as a stand-in for the term of art of a "master." Likewise, the term "subcontroller" is generally used herein when describing SPI as a stand-in for the term of art of a "slave." As such, when describing SPI interactions herein, the terms "controller" and "subcontroller" are meant to include the attributes of such SPI terms of art described above. It is understood, however, that in some embodiments (e.g., when context dictates otherwise, etc.) these terms may encompass additional or alternative meanings to the corresponding SPI terms of art.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, terrain, etc. Additionally, the one or more light emitters could emit light into a local environment of the lidar system itself. For example, light emitted from the one or more light emitters could interact with a housing of the lidar system and/or surfaces or structures coupled to the lidar system. In some cases, the lidar system could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

A lidar device can determine distances to environmental features while scanning through a scene (e.g., the portion of the surrounding environment observable from the perspective of the lidar device) to collect data that can be assembled into a "point cloud" indicative of reflective surfaces in the surrounding environment. Individual points in the point cloud can be determined, for example, by emitting a laser pulse and detecting a returning pulse, if any, reflected from an object in the surrounding environment, and then determining a distance to the object according to a time delay between the emission of the pulse and the reception of the reflected pulse. As a result, for example, a three-dimensional map of points indicative of locations of reflective features in the surrounding environment can be generated. In some lidar devices, a series of laser pulses may be emitted (e.g., simultaneously, sequentially, etc.) by one or more light emitters (e.g., lasers, etc.) and a corresponding series of return pulses may be detected by one or more light detectors (e.g., photodiodes, etc.).

In some embodiments, the light emitters used to emit one or more pulses in a lidar device may include one or more lasers (e.g., laser diodes, etc.). Such lasers may receive power from one or more capacitors that selectively store and discharge energy. Further, which lasers fire during a given firing cycle of the lidar device and what power is used to fire those lasers may be important (e.g., based on eye-safety requirements for laser-emission power, etc.). In order to ensure the proper firing sequence and associated firing power is used for the light emitters, a lidar device may include a laser driver.

The laser driver may receive instructions from one or more central computing devices (e.g., a central computer used to control an entire autonomous vehicle or semi-autonomous vehicle, and/or a computing device used to control the entire lidar device, etc.). Based on the received instructions, the laser driver may set emission characteristics for the associated light emitters. For example, the laser driver may control: the charging time for capacitors associated with the light emitters, the charging current for capacitors associated with the light emitters, the charging voltage for capacitors associated with the light emitters, selective discharging of the capacitors through one or more light emitters (e.g., to cause one or more lasers within the lidar device to fire during a given time interval as opposed to discharging the capacitors to ground to prevent a given laser from firing, etc.), etc.

Because it may be important that specific light emitters fire at specific powers, it may be desired that the laser driver receives proper instructions (e.g., uncorrupted instructions, etc.) from one or more central computing devices. In order to ensure the instructions are correctly received (e.g., the received instructions are not jumbled due to a bit-flip or a transposition, etc.), embodiments described herein provide a communication protocol between a serial peripheral interface (SPI) subcontroller and a SPI controller. The communication protocol described herein may provide that, during a write transaction (e.g., when the SPI controller is issuing a write command to the SPI subcontroller, etc.), the SPI subcontroller only writes payload data when the error-checking process confirms that the data is correct (e.g., correct to within a threshold probability, etc.). Likewise, the communication protocol described herein may provide that, during a write transaction, the SPI controller can use one or more communication channels to receive information from the SPI subcontroller that also indicates whether the instructions were correctly received (e.g., the SPI controller can receive an ACK or a NACK from the SPI subcontroller, etc.). Yet further, the communication protocol described herein may provide that a specific communication is sent from the SPI controller to the SPI subcontroller for a read transaction (e.g., when the SPI controller is issuing a read command to the SPI subcontroller, etc.) that prevents the SPI subcontroller (e.g., to within a threshold probability, etc.) from misinterpreting the communication as a write transaction (e.g., based on data corruption, etc.).

Each of the capabilities of example embodiments described above may prevent (e.g., in the case of a lidar device that uses SPI communications between one or more central computers and the laser driver, etc.) an SPI subcontroller (e.g., laser driver, etc.) from executing unintended commands (e.g., causing one or more light emitters to fire when they should not or causing one or more light emitters to fire at an incorrect power, etc.). Further, each of the capabilities of example embodiments described above may allow an SPI controller (e.g., the central computer of a lidar device, etc.) to verify whether the SPI subcontroller received uncorrupted instructions (e.g., the central computer of the lidar device can ensure the laser driver did not cause any light emitters to fire improperly, etc.).

One example embodiment includes an SPI controller (e.g., central computer of a lidar device, etc.) connected to an SPI subcontroller (e.g., laser driver, etc.) through four communication channels (e.g., a four-wire interface, etc.). The communication channels may include a Slave Select channel ($SS_N$), a clock channel (SCLK), a Master In Slave Out channel (MISO), and a Master Out Slave In (MOSI) channel. The communication packets transmitted by the SPI controller to the SPI subcontroller (e.g., over the MOSI channel, etc.) and the communication protocol may be 4 bytes (i.e., 32 bits) in size (e.g., with each byte beginning with the most-significant bit, etc.). Each communication packet may include: a read/write bit (e.g., with a "0" indicating read and a "1" indicating write, etc.), a 7-bit address segment, a 2-byte payload data segment, and a 1-byte forward error-checking code segment. Each bit in the 4-byte packet may be transmitted along a clock-edge of the SCLK (e.g., a rising clock-edge or a falling clock-edge signal, etc.). While receiving the payload data segment, the SPI subcontroller (e.g., an integrated circuit, such as a processor, of the SPI subcontroller, etc.) may calculate a reverse error-checking code. The forward error-checking code and/or the reverse error-checking code may include a cyclic redundancy check (e.g., a 9-bit polynomial, CRC-8, such as the 1-Wire 0x31 polynomial, etc.). Such cyclic redundancy checks may be computed using hardware logic, for example.

In the case of a write transaction (e.g., when the read/write bit indicates a write transaction is to occur, etc.), the SPI subcontroller may compare the computed reverse error-checking code to the received forward error-checking code. If the two error-checking codes match, the SPI subcontroller (e.g., an integrated circuit of the SPI subcontroller, etc.) may proceed to write the payload data to the address (e.g., resulting in the emission of light from one or more light emitters in the case of a laser driver of a lidar device, etc.). If the two error-checking codes do not match, however, the SPI subcontroller (e.g., an integrated circuit of the SPI subcontroller, etc.) may refrain from writing the payload data to the address. Regardless of whether the two error-checking codes match, the SPI controller may receive the computed reverse error-checking code from the SPI subcontroller (e.g., over the MISO channel, etc.). In this way, the SPI controller may determine whether a proper write transaction was executed (e.g., by comparing the transmitted forward error-checking code to the received reverse error-checking code, etc.). If a write transaction failed (e.g., because the two error-checking codes do not match, etc.), the SPI controller can take remedial action. For example, the SPI controller may retransmit the previous packet or may alert an upstream computing device (e.g., a central computer of an autonomous vehicle to which the lidar device is attached, etc.) that a write did not occur (e.g., in the case of a lidar device, that the light emitters did not emit light during one or more time segments, etc.).

In a read transaction (e.g., when the read/write bit indicates a read transaction is to occur, etc.), like in a write transaction, the SPI subcontroller may calculate a reverse error-checking code. Likewise, regardless if the two error-checking codes match, the SPI controller may receive the computed reverse error-checking code from the SPI subcontroller (e.g., also over the MISO channel, etc.).

However, unlike in a write transaction and because a read transaction may be less likely to be seriously detrimental if performed unintendedly (e.g., because a read transaction may not inherently cause one or more light emitters to fire in a lidar device, etc.), the SPI subcontroller may provide data read from the address to the SPI controller over the MISO channel even if the computed reverse error-checking code does not match the forward error-checking code. In fact, in some embodiments, the SPI subcontroller may not even compare the computed reverse error-checking code to the forward error-checking code, at all. Further, as a result of this, the SPI subcontroller may begin providing the data read from the address to the SPI controller as soon as the portion of the communication packet corresponding to the address is received. In this way, the read transaction can be expedited (e.g., because the SPI subcontroller does not need to wait for a reverse error-checking code to be computed/compared to a received forward error-checking code, etc.).

Further, because in a read transaction there is no payload data to be transmitted in the packet communicated from the SPI controller to the SPI subcontroller, the 2-bytes of the packet dedicated to payload data may be superfluous. Similarly, in embodiments where the SPI subcontroller does not perform a comparison of the forward error-checking code to the calculated reverse error-checking code for read transactions, a provision of the forward error-checking code by the SPI controller may also be superfluous. As such, to further enhance robustness against improper read/write transactions, the SPI controller (e.g., an integrated circuit of the SPI controller, etc.) may assign specified values to the payload data segment and to the forward error-checking code segment that are unlikely to result in the SPI subcontroller performing a write transaction, even if the read/write bit were somehow flipped. For example, the SPI controller may assign a value to the forward error-checking code that intentionally does not correspond to the CRC-8 calculated for the given address segment along with the payload data segment when the read/write bit indicates that a write transaction is to occur (e.g., as a result of an unintended bit-flip, etc.). In this way, even if a read/write bit-flip occurred, the calculated reverse error-checking code would not match the forward error-checking code provided, and the SPI subcontroller would refrain from performing an unintended write transaction.

While the embodiments described above include the SPI subcontroller providing the read data from the address regardless of whether the forward error-checking code and the reverse error-checking code match, other embodiments are also possible and are contemplated herein. For example, in some embodiments (e.g., embodiments where a read transaction may also cause potentially harmful results, etc.), the SPI subcontroller may wait until a reverse error-checking code is calculated and a comparison to a received forward error-checking code is performed to proceed with a read routine. In such embodiments, if the two error-checking codes do not match, the SPI subcontroller may refrain from providing data read from the address to the SPI controller (e.g., over the MISO channel, etc.).

While example embodiments are described in terms of lidar devices and laser drivers/controllers, it is understood that the techniques described herein are broadly applicable to a multitude of SPIs. Any SPI may employ the error-checking techniques described herein to allow for a bidirectional communication between controller and subcontroller that alerts both controller and subcontroller when one or more communication errors has occurred. Further, the number of connections (e.g., communication channels, etc.) between controller and subcontroller and the specific error-checking codes (e.g., cyclic redundancy checks, etc.) used are provided solely as examples. It is understood that other numbers of SPI connections and/or other types of error-checking codes could additionally or alternatively be employed. Such additional or alternative embodiments are contemplated herein.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the laser rangefinder/lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor, an application-specific integrated circuit (ASIC), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speed-bumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or laser rangefinder/lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors 216 for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more range finders, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar system could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, range finders, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.). For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e., pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 3:
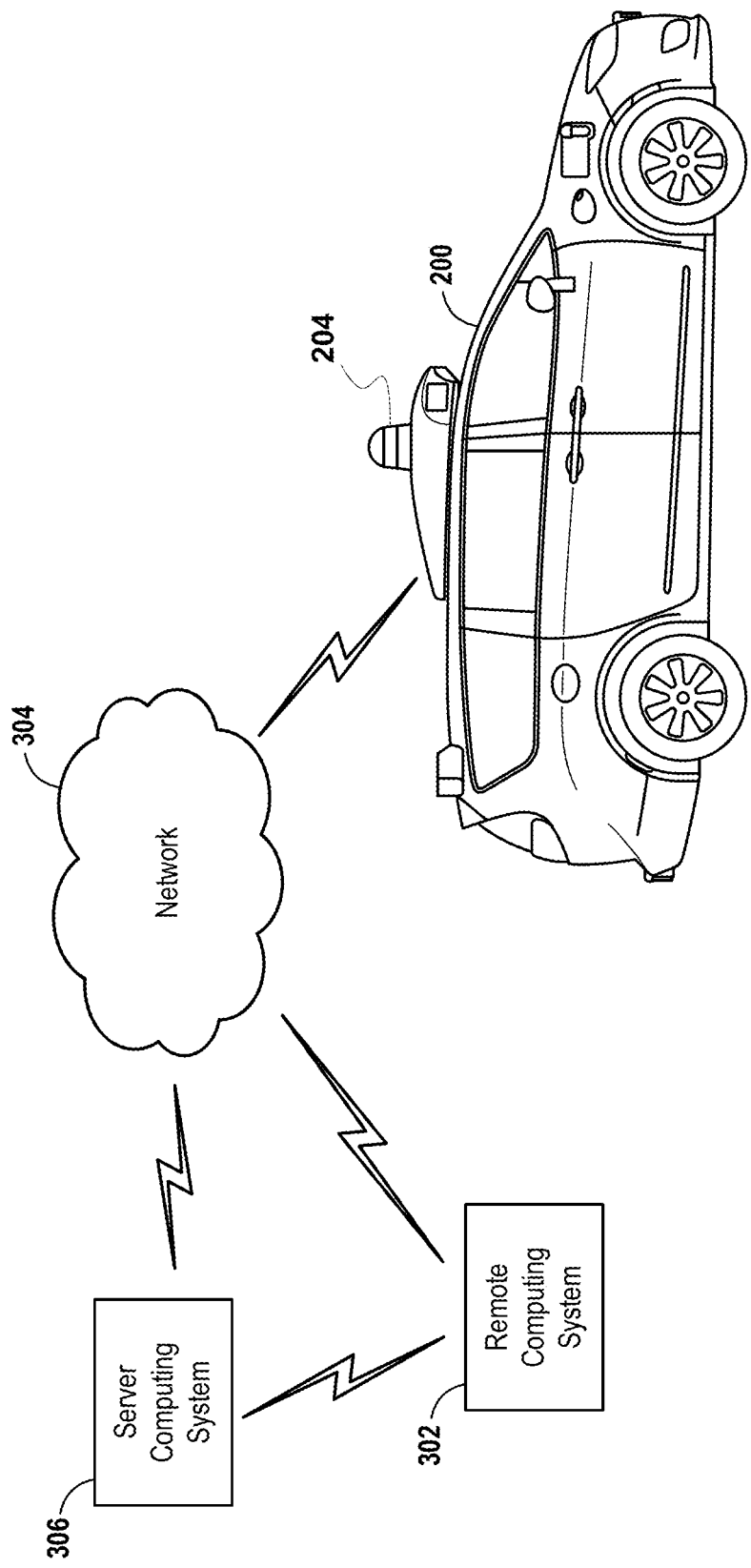
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., infrared light, etc.) signals.

The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

Figure 4A:
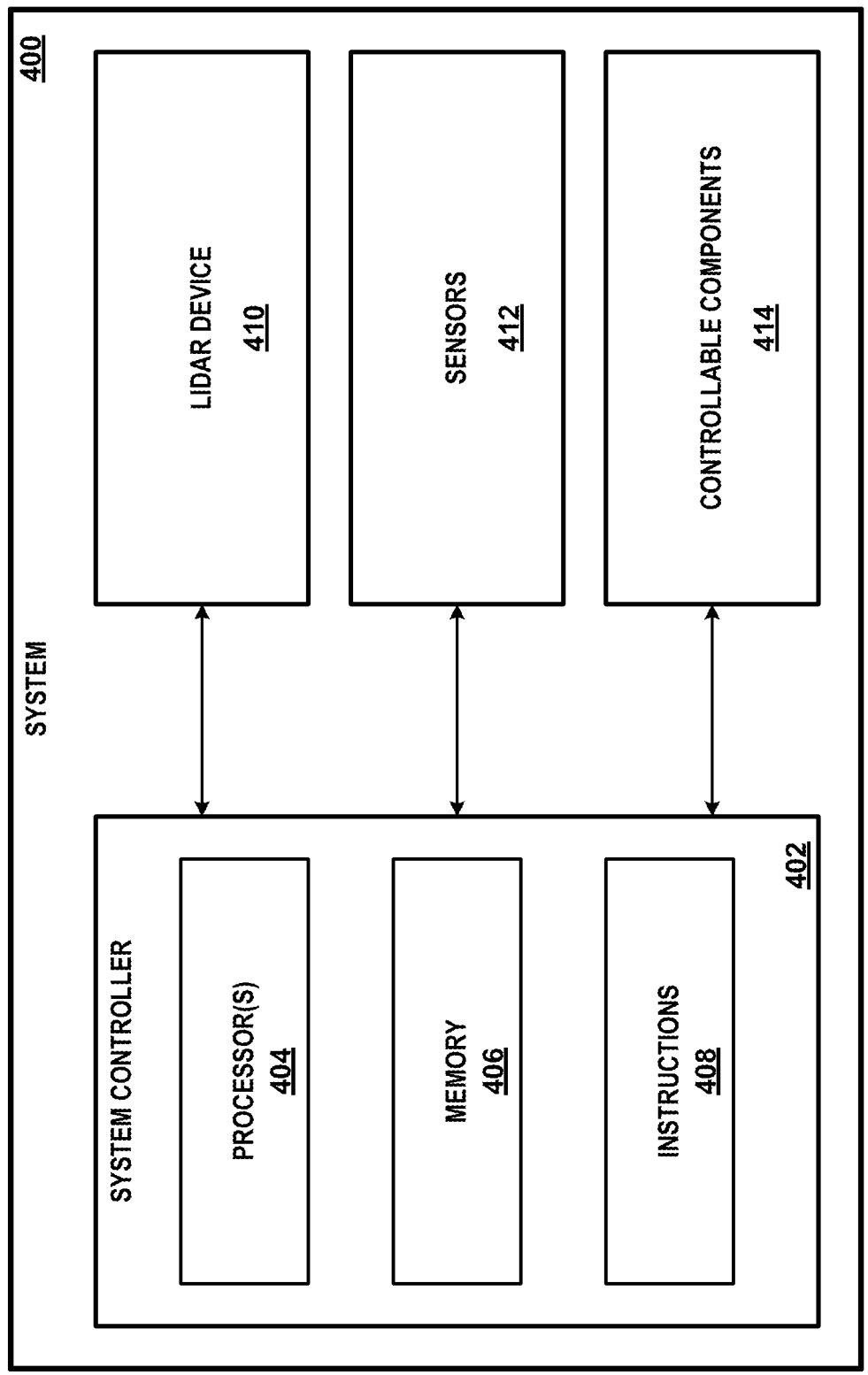
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores, etc.) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory, etc.), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses, etc.) and one or more light detectors configured to detect light (e.g., reflected portions of the light pulses, etc.). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, proximity sensing, etc.).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera, etc.), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode, etc.). Within examples, the lidar device 410 and the sensors 412 are also controllable by the system controller 402.

Figure 4B:
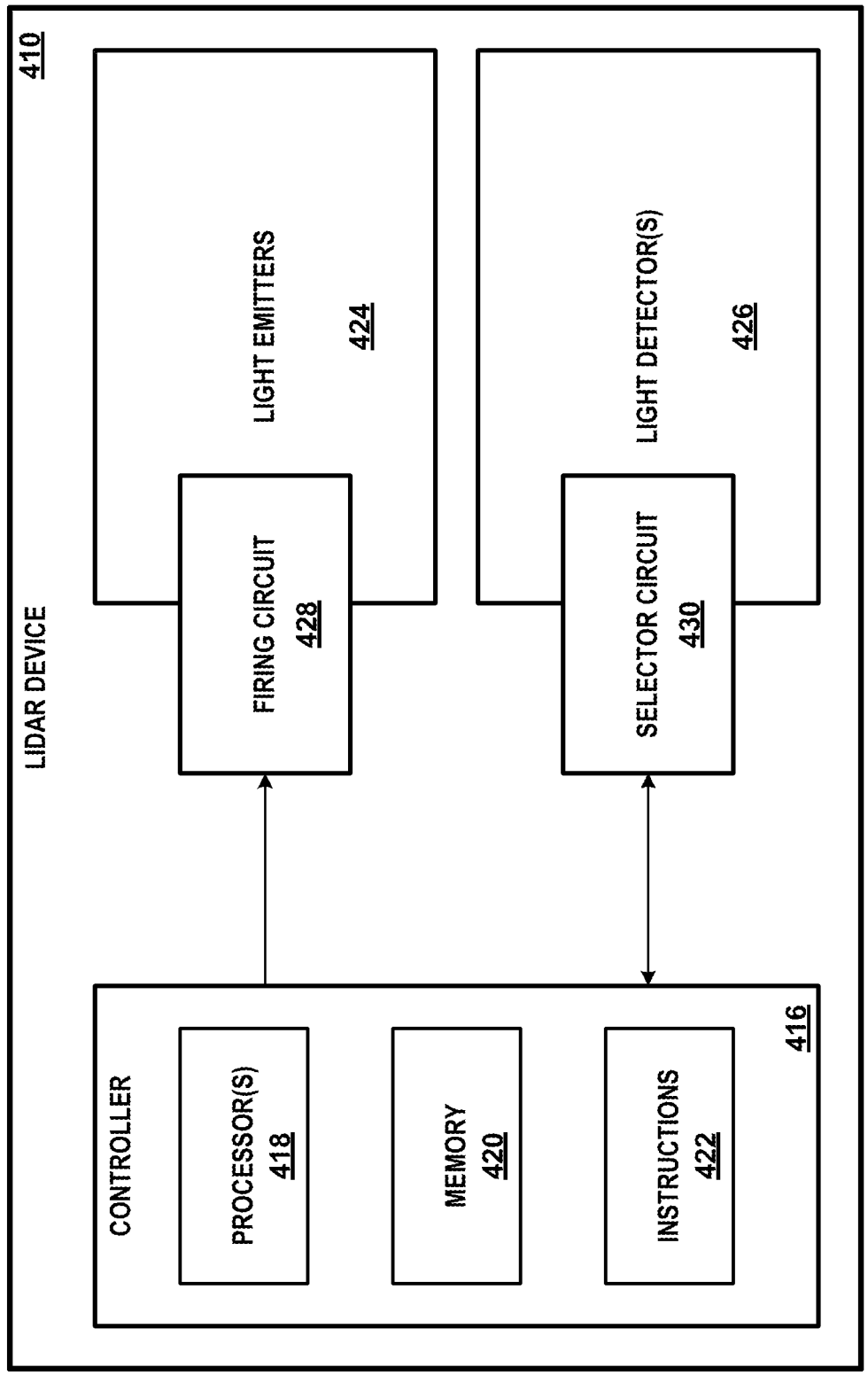
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory, etc.), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, construction cones, etc. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system, etc.) and intensities of each reflected light pulse.

The firing circuit 428 is used for selecting light emitters for emitting light pulses. The selector circuit 430 similarly is used for sampling outputs from light detectors.

Figure 5:
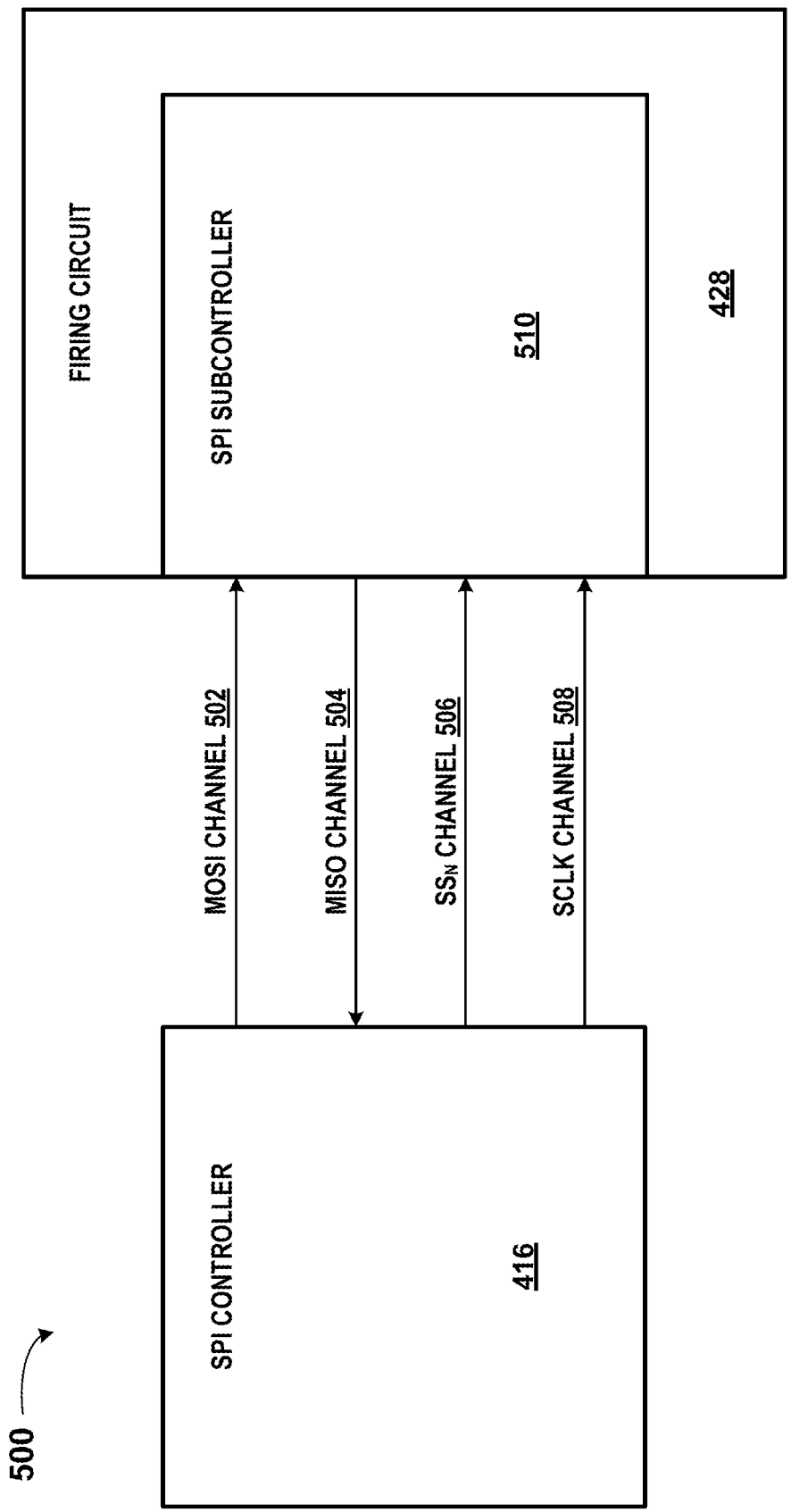
FIG. 5 is a block diagram of a SPI, according to example embodiments.

FIG. 5 illustrates a system 500. The system 500 may correspond to a portion of the lidar device 410 illustrated in FIG. 4B. For example, the system may include a controller 416 (e.g., an SPI controller, etc.). Though not illustrated, the SPI controller 416 may include the processor 418, the memory 420, and/or the instructions 422 illustrated in FIG. 4B. In addition, the system 500 may include a firing circuit 428. Although not illustrated in FIG. 5, the firing circuit 428 may be connected to one or more light emitters 424 (e.g., LEDs, laser diodes, etc.), as illustrated in FIG. 4B. The firing circuit 428 may include an SPI subcontroller 510. In some embodiments, the SPI subcontroller 510 may correspond to a laser controller/firing controller. For example, the SPI subcontroller 510 may be primarily responsible for driving laser diodes and the SPI controller 416 may generate a time pulse on a dedicated trigger pin that is used by the SPI subcontroller 510. Additionally, like the SPI controller 416, the SPI subcontroller 510 may include a processor, a memory, and/or instructions. The SPI controller 416 may also receive feedback from the SPI subcontroller 510, such as feedback usable to measure pulse width, which may allow for closed-loop control of the trigger signal pulse. Further, in some embodiments, the SPI controller 416 may control multiple firing circuits/SPI subcontrollers. Still further, in some embodiments, multiple SPI controllers 416 (each potentially having one or more associated firing circuits/SPI subcontrollers) may be daisy-chained together to form a lidar device.

Further, the SPI controller 416 and the SPI subcontroller 510 may communicate with one another over an SPI. As illustrated, the SPI may include a MOSI channel 502, a MISO channel 504, a $SS_N$ channel 506, and a SCLK channel 508 over which the SPI controller 416 and the SPI subcontroller 510 communicate. In other words, the SPI may be a four-wire interface. In some embodiments, the SPI controller 416 may transmit commands (e.g., read commands, write commands, etc.) to the SPI subcontroller 510 for execution by the SPI subcontroller 510 over the SPI. For instance, the SPI controller 416 may transmit a write command that, when executed by the SPI subcontroller 510, causes one or more associated light emitters to fire using one or more elements (e.g., capacitors, diodes, switches, transistors, etc.) of the firing circuit 428.

The MOSI channel 502 may be a channel over which bits representing data are communicated from the SPI controller 416 to the SPI subcontroller 510. For example, forward error-checking codes, target addresses, and/or write payload data may be communicated from the SPI controller 416 to the SPI subcontroller 510 over the MOSI channel 502 as a series of bits. Additionally or alternatively, indications of whether a read command or a write command is to be executed may be communicated over the MOSI channel 502 (e.g., as a read/write bit, etc.). Other information may be communicated from the SPI controller 416 to the SPI subcontroller 510 as well, and is contemplated herein (e.g., a status of the SPI controller 416, a power on/off command, etc.).

The MISO channel 504 may be a channel over which bits representing data are communicated from the SPI subcontroller 510 back to the SPI controller 416. For example, reverse error-checking codes and/or read payload data may be communicated from the SPI subcontroller 510 to the SPI controller 416 over the MOSI channel 502. Additional or alternative data can be communicated, as well, and is contemplated herein.

The $SS_N$ channel 506 may be a channel by which the SPI controller 416 selects an SPI subcontroller 510 for interaction. In embodiments where the system 500 has only a single SPI subcontroller 510 (e.g., as illustrated in FIG. 5, etc.), such a channel may still be used by the SPI controller 416 to trigger a transaction with the SPI subcontroller 510. In some embodiments, though, there may be multiple SPI subcontrollers (e.g., associated with multiple firing circuits, etc.). The MOSI channels of each of the SPI subcontrollers may all be tied to a single MOSI channel of the SPI controller. Likewise, the MISO channels of each of the SPI subcontrollers may all be tied to a single MISO channel of the SPI controller. Further, the SCLK channels of each of the SPI subcontrollers may all be tied to a single SCLK channel of the SPI controller. However, in such embodiments, the SPI controller may include multiple $SS_N$ channels/ports, each tied to the $SS_N$ port of a different SPI subcontroller. Further, the SPI controller may transmit a communication indication signal (e.g., a "0" or a low signal, etc.) to the $SS_N$ channel of the SPI subcontroller with which the SPI controller wishes to interact while transmitting a non-communication indication signal (e.g., a "1" or a high signal, etc.) to the $SS_N$ channels of the remaining SPI subcontrollers. In this way, the SPI subcontrollers may be alerted as to whether communications originating from the SPI controller (e.g., over the MOSI channel, etc.) are intended for that SPI subcontroller and/or the SPI subcontrollers may be alerted as to whether that SPI subcontroller is requested to transmit data (e.g., over the MISO channel, etc.) back to the SPI controller.

The SCLK channel 508 may represent a clock signal transmitted from the SPI controller 416 to the SPI subcontroller 510. The clock signal may be used to ensure that the clock of the SPI subcontroller 510 is synchronized with the clock of the SPI controller 416. For example, the SPI subcontroller 510 may perform operations based on a rising edge of the clock signal or the falling edge of the clock signal from the SCLK channel 508. As such, the operations performed by the SPI subcontroller 510 and the transmissions to/from the SPI subcontroller 510 may occur in a manner that is synchronized with the SPI controller 416. In some embodiments, the SCLK channel 508 may be tied directly to an internal clock (e.g., quartz clock, etc.) of the SPI controller 416.

While a four-channel SPI is described above and throughout the disclosure, it is understood that other numbers of channels and communication protocols are also possible and are contemplated herein. For example, communication between the SPI controller 416 and the SPI subcontroller 510 could occur over one channel, two channels, three channels, five channels, six channels, seven channels, eight channels, nine channels, ten channels, etc. Additionally, while both the SPI controller 416 and the SPI subcontroller 510 illustrated in FIG. 5 have the same number of channels (i.e., four), it is understood that other embodiments are also possible and are contemplated herein. For example, in some embodiments, there may be multiple SPI subcontrollers/ firing circuits corresponding to a single SPI controller (e.g., in the case of a lidar device, a central computer of the lidar device may control multiple laser drivers/firing circuits, etc.). In such embodiments, the SPI controller may have multiple $SS_N$ ports (e.g., $SS_1$, $SS_2$, $SS_3$, etc.), with one $SS_N$ port corresponding to one of the SPI subcontrollers. However, each of the SPI subcontrollers may only have a single $SS_N$ port. In this way, for example, the SPI controller may output a "0" to a select $SS_N$ channel, while outputting a "1" to the other $SS_N$ channels, in order to select one of the SPI subcontrollers to interact with. In such an embodiment, the SPI controller would clearly have a different number of ports/channels than each of the SPI subcontrollers. For example, in an embodiment having three SPI subcontrollers, each of the SPI subcontrollers may have four ports/channels (e.g., MOSI, MISO, $SS_N$, SCLK, etc.) whereas the SPI controller may have seven ports/channels (e.g., MOSI, MISO, $SS_1$, $SS_2$, $SS_3$, SCLK, etc.). Other numbers and arrangements of ports/channels are also possible and are contemplated herein.

Further, while certain pieces of data are transmitted over specific channels, as described herein, it is understood that communication of those pieces of data over additional or alternative channels is also possible. Also, the directionality of the channels illustrated in FIG. 5 by the arrows is solely provided as an example. It is understood that, in various embodiments, various channels may have the reverse directionality (e.g., from the SPI subcontroller 510 to the SPI controller 416 as opposed to from the SPI controller 416 to the SPI subcontroller 510, etc.) or be bidirectional.

Figure 6:
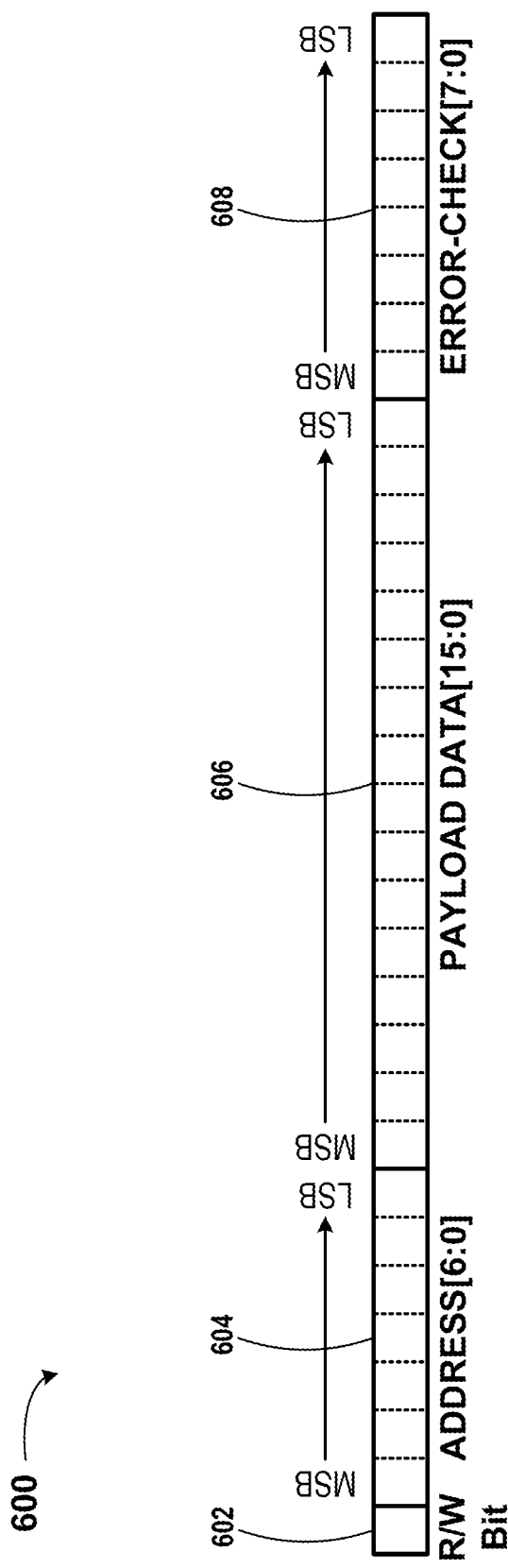
FIG. 6 is an illustration of a communication packet, according to example embodiments.

In some embodiments, communications/transactions between the SPI controller 416 and the SPI subcontroller 510 may occur using the transmission of data packets. For example, when transmitting a write command to the SPI subcontroller 510, the SPI controller 416 may prepare and transmit a data packet to the SPI subcontroller 510 (e.g., over the MOSI channel 502 of the SPI, etc.). An example data packet 600 is illustrated in FIG. 6. In some embodiments, as illustrated in FIG. 6, the data packet 600 may be 4 bytes in length. The data packet 600 may include a read/write bit 602, an address 604, payload data 606, and a forward error-checking code 608. Further, for data that spans multiple bits (e.g., the address 604, the payload data 606, the forward error-checking code 608, etc.), the data may be transmitted with the most-significant bit (MSB) first. However, it is understood that least-significant bit (LSB) first formats are also possible and contemplated herein.

The read/write bit 602 may provide an indication to the SPI subcontroller 510 of whether the SPI controller 416 is instructing the SPI subcontroller 510 to perform a read transaction or a write transaction. For example, if the read/write bit 602 of the data packet 600 is a "1," a write transaction may be indicated, whereas if the read/write bit 602 of the data packet 600 is a "0," a read transaction is indicated. The reverse is equally possible and is contemplated herein. Upon receiving a read/write bit 602 indicating a write transaction is to be performed, the SPI subcontroller 510 may begin executing a write routine (e.g., stored as instructions within a memory of the SPI subcontroller 510, etc.). Likewise, upon receiving a read/write bit 602 indicating a read transaction is to be performed, the SPI subcontroller 510 may begin executing a read routine (e.g., stored as instructions within a memory of the SPI subcontroller 510, etc.).

The address 604 may be a series of bits within the data packet 600 that represents the target address for the transaction. The address 604 may correspond to a target memory address within a memory of the SPI subcontroller 510 (e.g., a memory that is part of the integrated circuit of the SPI subcontroller 510, etc.). For example, in a write transaction, the address 604 may correspond to a memory address within the memory of the SPI subcontroller 510 to which the payload data 606 is to be written by the SPI subcontroller 510. Similarly, in a read transaction, the address 604 may correspond to a memory address within the memory of the SPI subcontroller 510 from which data is to be read by the SPI subcontroller 510 and, ultimately, transmitted to the SPI controller 416. As illustrated in FIG. 6, the address 604 may be a 7-bit value, beginning with the MSB. In other embodiments, the address 604 may be greater than or less than 7 bits in length and/or begin with the LSB. Further, the address 604 may be combined with the read/write bit 602 to form the first byte of the data packet 600.

The payload data 606 may be a series of bits within the data packet 600 that is to be written to a target address (e.g., the address 604, etc.) in a write transaction. In a read transaction, however, the payload data 606 in the data packet 600 transmitted from the SPI controller 416 may be superfluous and, therefore, possibly disregarded by the SPI subcontroller 510. As illustrated in FIG. 6, the payload data 606 may be 2 bytes in length, beginning with the MSB. In other embodiments, the payload data 606 may be greater than or less than 2 bytes in length and/or may begin with the LSB. In some embodiments (e.g., embodiments where the SPI subcontroller 510 is a laser driver for a lidar device, etc.), the payload data 606 may be used by the SPI subcontroller 510 to control the firing characteristics (e.g., firing time, firing sequence, firing power, charging characteristics for associated energy storage devices, etc.) of light emitters (e.g., when the payload data 606 is written to a memory of the SPI subcontroller 510, etc.). For example, the payload data 606 may be used to select a subset of the light emitters for firing during a subsequent firing cycle.

The forward error-checking code 608 may be a series of bits that is usable by the SPI subcontroller 510 to determine whether any transmission errors occurred (e.g., as a result of data corruption in the transmission channel, etc.) during transmission of the data packet 600. For example, the forward error-checking code 608 may include a cyclic redundancy check based on a 9-bit polynomial (e.g., a 1-Wire 0x31 polynomial, etc.). Other cyclic redundancy checks based on other polynomials (e.g., 17-bit polynomials, 33-bit polynomials, etc.) and/or other types of error-checking codes (e.g., checksums, etc.) are also possible and are contemplated herein. In an example write transaction, upon receiving the address 604 and the payload data 606, the SPI subcontroller 510 may calculate a reverse error-checking code (e.g., using the same cyclic redundancy check as was used to generate the forward error-checking code 608, etc.). Then, upon receiving the forward error-checking code 608, the SPI subcontroller 510 may compare the forward error-checking code 608 to the calculated reverse error-checking code. If the two codes are the same, the SPI subcontroller 510 may proceed to writing the payload data 606 to the transmitted address 604. If, however, the calculated reverse error-checking code is not the same as the transmitted forward error-checking code 608, the SPI subcontroller 510 may refrain from writing the payload data 606 to the transmitted address 604. As illustrated, in some embodiments the forward error-checking code 608 may be a byte in length, beginning with the MSB. In other embodiments, the forward error-checking code 608 may be greater than or less than a byte in length and/or may begin with the LSB.

It is understood that the data packet 600 illustrated in FIG. 6 is provided solely as an example and that other types of data packets are also possible and are contemplated herein. For example, an alternate data packet may include less than or greater than 4 bytes; the read/write bit, the address, the payload data, and/or the error-checking code could be transmitted in a different order; the relative sizes of the read/write bit, the address, the payload data, and/or the error-checking code could be different; the data packet 600 could be encrypted; etc.

Additionally, in some embodiments, the SPI subcontroller 510 may transmit data to the SPI controller 416 (e.g., over the MISO channel 504, etc.) using one or more data packets. The data packet(s) passed from the SPI subcontroller 510 to the SPI controller 416 may not be identical to the data packet 600 illustrated in FIG. 6, though. For example, the data packet(s) passed from the SPI subcontroller 510 to the SPI controller 416 may include payload data (e.g., data read from a memory of the SPI subcontroller 510, etc.) and an error-checking code (e.g., a reverse error-checking code calculated by the SPI subcontroller 510, etc.), but may not include a read/write bit or a target address. Further, the length of the payload data in the data packet(s) passed from the SPI subcontroller 510 to the SPI controller 416, the length of the error-checking code in the data packet(s) passed from the SPI subcontroller 510 to the SPI controller 416, the overall length of the data packet(s) passed from the SPI subcontroller 510 to the SPI controller 416, and/or the order of the data contained within the data packet(s) passed from the SPI subcontroller 510 to the SPI controller 416 may be different from the data packet 600 illustrated in FIG. 6.

Figure 7:
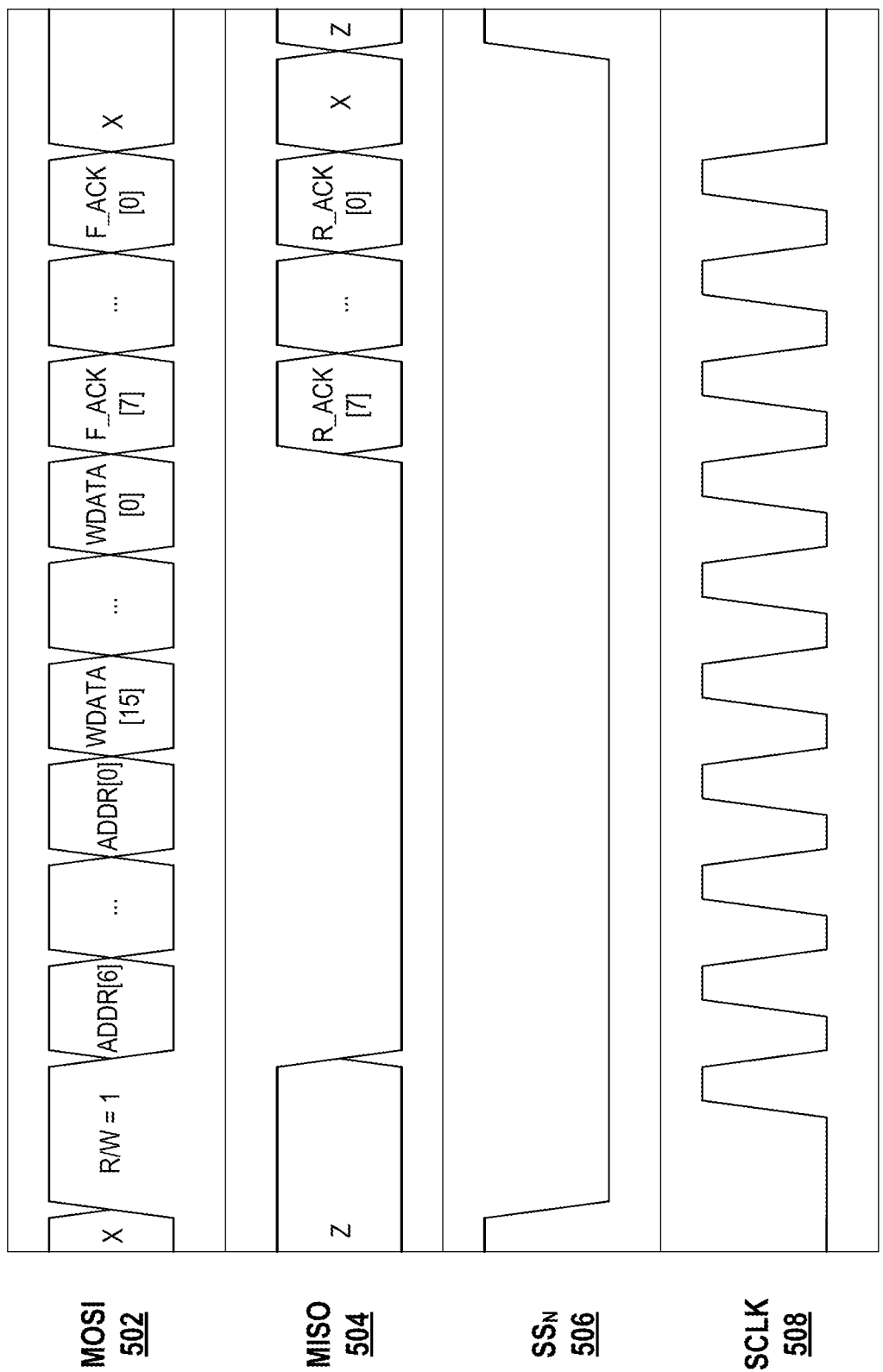
FIG. 7 is a timing diagram illustrating a write transaction, according to example embodiments.

FIG. 7 is a timing diagram illustrating a write transaction. As illustrated, the write transaction may occur over an SPI (e.g., between the SPI controller 416 and the SPI subcontroller 510 illustrated in FIG. 5, etc.) utilizing a periodic clock signal on the SCLK channel 508. The write transaction illustrated in FIG. 7 may include the communication of a data packet (e.g., the data packet 600 illustrated in FIG. 6, etc.) from the SPI controller 416 to the SPI subcontroller 510 (e.g., over the MOSI channel 502, etc.). The data packet may be communicated by the SPI controller 416 by modulating a signal (e.g., from a low value to a high value or from a high value to a low value, etc.) on the MOSI channel 502 along a clock edge of the signal of the SCLK channel 508 (e.g., on a falling edge of the SCLK channel 508, as illustrated in FIG. 7, etc.). Further, the write transaction may occur on the SPI subcontroller 510 by selecting the SPI subcontroller 510 (e.g., from among a plurality of SPI subcontrollers connected to a single SPI controller 416, etc.) using a signal on the SS$_N$ channel 506. As illustrated, the data packet 600 may be transmitted over the MOSI channel 502 while the SS$_N$ channel 506 has a signal value of "0." A value of "0" may indicate that the respective SPI subcontroller 510 is the SPI subcontroller with which the SPI controller 416 intends to interact with. It is understood that in other embodiments, a signal value of "1" may instead indicate that the respective SPI subcontroller 510 is the SPI subcontroller with which the SPI controller 416 intends to interact with.

As illustrated, a read/write bit 602 with a value of "1" may be transmitted over the MOSI channel 502. This may indicate to the SPI subcontroller 510 that a write routine is to be performed. In addition, an address 604 may be communicated using the MOSI channel 502. As illustrated, the address 604 may be communicated one bit at a time, with the MSB first (i.e., from ADDR[6] to ADDR[0]). The address 604 may correspond to a memory address in the memory of the SPI subcontroller 510 to which the payload data is to be written during the write routine. Further, the payload data 606 (i.e., the data to be written to the address 604 during the write transaction) may be communicated from the SPI controller 416 to the SPI subcontroller 510 over the MOSI channel 502. As illustrated, the payload data 606 may be communicated one bit at a time, with the MSB first (i.e., from WDATA[15] to WDATA[0]).

As the SPI subcontroller 510 is receiving the address 604 and the payload data 606, the SPI subcontroller 510 (e.g., a processor of the SPI subcontroller 510 executing instructions stored within a memory, etc.) may begin calculating a reverse error-checking code based on the address 604 and the payload data 606. For example, the reverse error-checking code may be calculated according to a polynomial for a cyclic redundancy check. In some embodiments, the SPI subcontroller 510 may only calculate the reverse error-checking code when the read/write bit 602 indicates that a write routine is to be performed (e.g., when the read/write bit 602 is a "1," as illustrated in FIG. 7, etc.).

Upon calculating the reverse error-checking code, the SPI subcontroller 510 may communicate the calculated reverse error-checking code to the SPI controller 416 over the MISO channel 504. As illustrated, the reverse error-checking code may be communicated one bit at a time, with the MSB first (i.e., from R_ACK[7] to R_ACK[0]). Herein, the reverse and forward error-checking codes may be referred to as "ACK" or "NACK," as they can serve as an acknowledgment (either to the SPI controller 416 from the SPI subcontroller 510 or vice versa) of whether a data packet or a piece of a data packet was received properly (e.g., in an uncorrupted fashion, etc.). The SPI controller 416 may use the reverse error-checking code to determine whether a transmission error occurred (e.g., by comparing the reverse error-checking code to the forward error-checking code 608, etc.). Additionally or alternatively, the SPI controller 416 may transmit the forward error-checking code and the reverse error-checking code to another device (e.g., a central computing device for an autonomous or semi-autonomous vehicle, a fleet server configured to monitor the status of a fleet of autonomous or semi-autonomous vehicles, etc.) to determine whether a transmission error has occurred. If the SPI controller 416 (or another computing device) determines that a transmission error has occurred (e.g., the forward error-checking code 608 and the reverse error-checking code are not the same, etc.), appropriate remedial action may be taken. Such action may include the SPI controller 416 retransmitting the data packet 600 (or a piece of the data packet 600, such as the payload data 606) to the SPI subcontroller 510 over the SPI; the SPI subcontroller 510 and/or the SPI controller 416 being repaired or replaced; a flag being set indicating that the SPI subcontroller 510, the SPI controller 416, an associated lidar device, an associated firing circuit, and/or associated light emitters are functioning improperly and/or require repair; a decommissioning of the SPI subcontroller 510, the SPI controller 416, an associated lidar device, an associated firing circuit, and/or associated light emitters; etc. If, however, the SPI controller 416 (or another computing device) determines that a transmission error has not occurred (e.g., the forward error-checking code 608 and the reverse error-checking code are the same, etc.), the SPI controller 416 and/or an associated computing device may output an indication to one or more computing devices (e.g., a central computing device associated with an autonomous or semi-autonomous vehicle, a fleet server configured to monitor the status of a fleet of autonomous or semi-autonomous vehicles, a mobile computing device, etc.) that the write transaction was performed properly (e.g., that the proper light emitters in an associated lidar device were fired with appropriate firing settings, such as timing, power, etc.).

Additionally, the forward error-checking code 608 may be communicated from the SPI controller 416 to the SPI subcontroller 510 over the MOSI channel 502. As illustrated, the forward error-checking code may be communicated one bit at a time, with the MSB first (i.e., from F_ACK[7] to F_ACK[0]). Upon receiving the forward error-checking code 608, the SPI subcontroller 510 may compare the forward error-checking code 608 to a calculated reverse error-checking code (e.g., previously calculated by the SPI subcontroller 510 based on the received address 604 and the received payload data 606, etc.). If the forward error-checking code 608 matches the reverse error-checking code, the SPI subcontroller 510 may proceed to writing the payload data 606 to the address 604 within the SPI subcontroller 510. In embodiments where the SPI subcontroller 510 is a laser driver for a lidar device, writing the payload data 606 to the address 604 may result in one or more light emitters of the lidar device firing (e.g., during a subsequent firing cycle, etc.) with associated firing parameters (e.g., emission duration, emission power, charging current and/or voltage for capacitors of an associated firing circuit, etc.). If, however, the forward error-checking code 608 does not match the reverse error-checking code, the SPI subcontroller 510 may refrain from writing the payload data 606 to the address 604. In embodiments wherein the SPI subcontroller 510 is a laser driver for a lidar device, this may prevent light emitters of the lidar device from firing (e.g., during a subsequent firing cycle, etc.) and/or may maintain the firing parameters used during a previous firing cycle.

Figure 8:
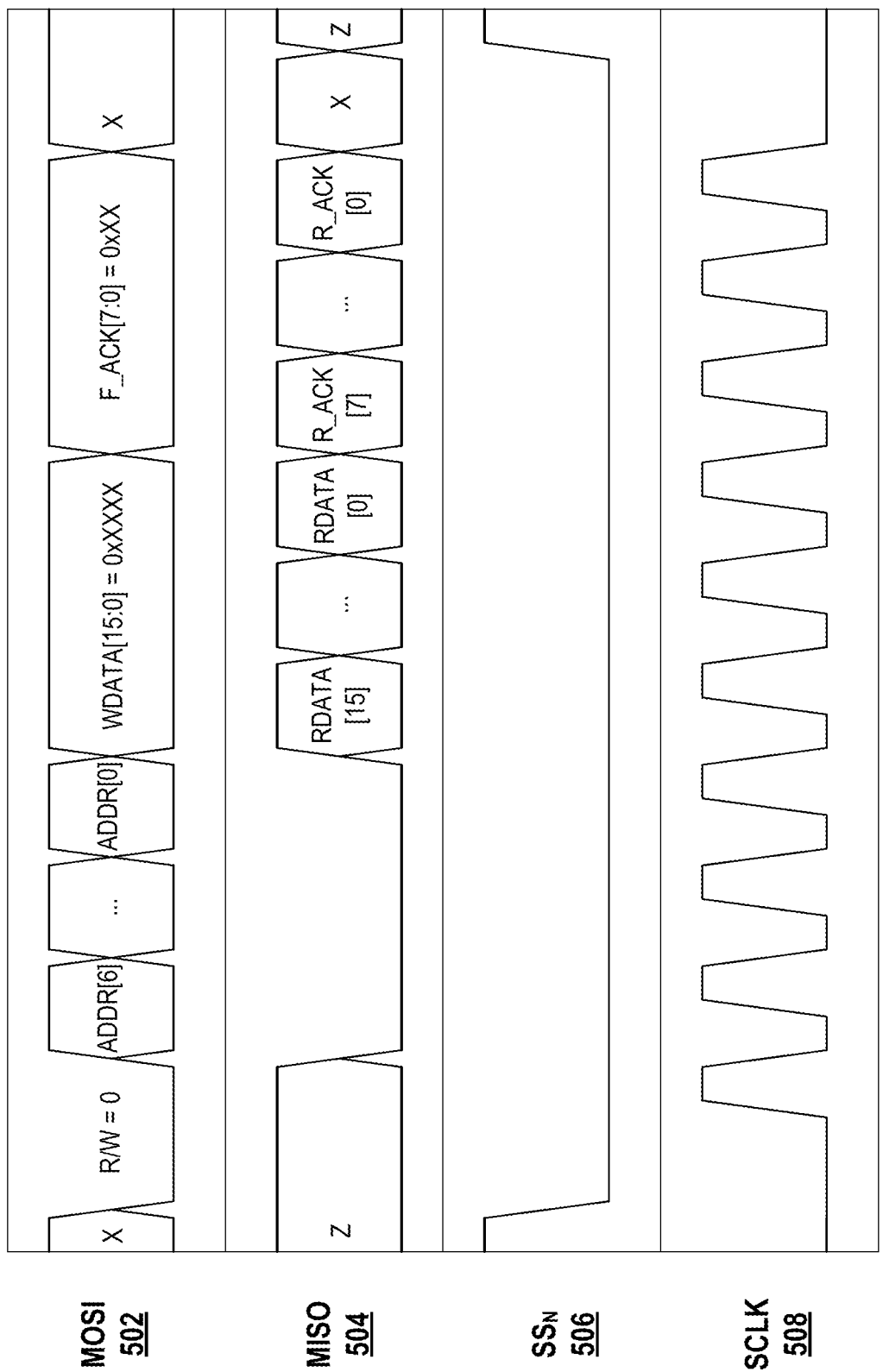
FIG. 8 is a timing diagram illustrating a read transaction, according to example embodiments.

FIG. 8 is a timing diagram illustrating a read transaction. As illustrated, the read transaction may occur over an SPI (e.g., between the SPI controller 416 and the SPI subcontroller 510 illustrated in FIG. 5, etc.) utilizing a periodic clock signal on the SCLK channel 508. The read transaction illustrated in FIG. 8 may include the communication of a data packet (e.g., the data packet 600 illustrated in FIG. 6, etc.) from the SPI controller 416 to the SPI subcontroller 510 (e.g., over the MOSI channel 502, etc.). The data packet may be communicated by the SPI controller 416 by modulating a signal (e.g., from a low value to a high value or from a high value to a low value, etc.) on the MOSI channel 502 along a clock edge of the signal of the SCLK channel 508 (e.g., on a falling edge of the SCLK channel 508, as illustrated in FIG. 8, etc.). Further, the read transaction may occur on the SPI subcontroller 510 by selecting the SPI subcontroller 510 (e.g., from among a plurality of SPI subcontrollers connected to a single SPI controller 416, etc.) using a signal on the SS$_N$ channel 506. As illustrated, the data packet 600 may be transmitted over the MOSI channel 502 while the SS$_N$ channel 506 has a signal value of "0." A value of "0" may indicate that the respective SPI subcontroller 510 is the SPI subcontroller with which the SPI controller 416 intends to interact. It is understood that in other embodiments, a signal value of "1" may instead indicate that the respective SPI subcontroller 510 is the SPI subcontroller with which the SPI controller 416 intends to interact.

As illustrated, a read/write bit 602 with a value of "0" may be transmitted over the MOSI channel 502. This may indicate to the SPI subcontroller 510 that a read routine is to be performed. In addition, an address 604 may be communicated using the MOSI channel 502. As illustrated, the address 604 may be communicated one bit at a time, with the MSB first (i.e., from ADDR[6] to ADDR[0]). The address 604 may correspond to a memory address in the memory of the SPI subcontroller 510 from which the payload data is to be read during the read routine. Given that the transaction depicted in FIG. 8 is a read transaction, the data in the payload data slot communicated to SPI subcontroller 510 over the MOSI channel 502 is not being written to a memory of the SPI subcontroller 510. As such, the payload data in the data packet 600 communicated over the MOSI channel 502 may be set to a default value (e.g., all 0's, all 1's, or some other value). Alternatively, in some embodiments, because the payload data segment would otherwise go unused, the SPI controller 416 may assign a specified value to the payload data segment to provide additional robustness against bit-flips or other errors. For example, if a bit-flip occurs in the read/write bit 602 (e.g., a read value is bit-flipped to a write value, etc.), the SPI subcontroller 510 may attempt to write the payload data 606 to the address 604 if the received forward error-checking code 608 matches the calculated reverse error-checking code. To prevent this unintended write from occurring, the SPI controller 416 may send payload data 606 such that, when an error-checking code is determined based on the payload data 606 along with a read/write bit 602 that indicates a write is to be performed, the error-checking code will not correspond to the transmitted forward error-checking code 608. As such, if a bit-flip occurs in the read/write bit 602 (and, therefore, the SPI subcontroller 510 incorrectly interprets that a write is to be performed), when the SPI subcontroller 510 calculates the reverse error-checking code based on the address 604 and/or the payload data 606, that reverse error-checking code will not match the received forward error-checking code 608. Thus, the SPI subcontroller 510 will refrain from writing the payload data 606 to the address 604. In this way, additional robustness against unintended write routines may be provided. As such, in embodiments where the SPI subcontroller 510 represents a laser driver in a lidar device, unintended firings of light emitters and firings of light emitters with unintended firing parameters may also be prevented.

Upon receiving the read/write bit 602 indicating that a read transaction is to be performed and receiving the address 604 that is to be read from, the SPI subcontroller 510 may begin reading data from a memory address of the SPI subcontroller 510 that corresponds to the address 604. In embodiments where the SPI subcontroller 510 is a laser driver of a lidar device, the data read from the address 604 may correspond to firing parameters used in a previous firing of one or more light emitters of the lidar device, for example. This data read from the address 604 may be provided (e.g., one bit at a time) to the SPI controller 416 over the MISO channel 504, with the MSB first (e.g., from RDATA[15] to RDATA[0]). Further, as the SPI subcontroller 510 is receiving the address 604 and the payload data 606, the SPI subcontroller 510 (e.g., a processor of the SPI subcontroller 510 executing instructions stored within a memory, etc.) may begin calculating a reverse error-checking code based on the address 604 and the payload data 606. For example, the reverse error-checking code may be calculated according to a polynomial for a cyclic redundancy check. Upon calculating the reverse error-checking code, the SPI subcontroller 510 may communicate the calculated reverse error-checking code to the SPI controller 416 over the MISO channel 504. As illustrated, the reverse error-checking code may be communicated one bit at a time, with the MSB first (i.e., from R_ACK[7] to R_ACK[0]). The SPI controller 416 may use the reverse error-checking code to determine whether a transmission error occurred (e.g., by comparing the reverse error-checking code to the forward error-checking code 608, etc.). Additionally or alternatively, the SPI controller 416 may transmit the forward error-checking code and the reverse error-checking code to another device (e.g., a central computing device for an autonomous or semi-autonomous vehicle, a fleet server configured to monitor the status of a fleet of autonomous or semi-autonomous vehicles, etc.) to determine whether a transmission error has occurred. If the SPI controller 416 (or another computing device) determines that a transmission error has occurred (e.g., the forward error-checking code 608 and the reverse error-checking code are not the same, etc.), appropriate remedial action may be taken. Such action may include the SPI controller 416 retransmitting the data packet 600 (or a piece of the data packet 600, such as the payload data 606) to the SPI subcontroller 510 over the SPI; the SPI subcontroller 510 and/or the SPI controller 416 being repaired or replaced; a flag being set indicating that the SPI subcontroller 510, the SPI controller 416, an associated lidar device, an associated firing circuit, and/or associated light emitters are functioning improperly and/or require repair; a decommissioning of the SPI subcontroller 510, the SPI controller 416, an associated lidar device, an associated firing circuit, and/or associated light emitters; etc. If, however, the SPI controller 416 (or another computing device) determines that a transmission error has not occurred (e.g., the forward error-checking code 608 and the reverse error-checking code are the same), the SPI controller 416 and/or an associated computing device may output an indication to one or more computing devices (e.g., a central computing device associated with an autonomous or semi-autonomous vehicle, a fleet server configured to monitor the status of a fleet of autonomous or semi-autonomous vehicles, a mobile computing device, etc.) that the read transaction was performed properly.

While only a single write command is illustrated in FIG. 7 and a single read command is illustrated in FIG. 8, it is understood that, in some embodiments, multiple commands may be executed within a single $SS_N$ window (i.e., within a single cycle of the signal on the $SS_N$ channel corresponding to a given SPI subcontroller 510 going from low-to-high and back again or from high-to-low and back again). For example, multiple write transactions; multiple write transactions followed by a single read transaction; or multiple write transactions interspersed with multiple read transactions may occur within a single $SS_N$ window. Other combinations of read/write transactions are also possible and are contemplated herein.

Figure 9:
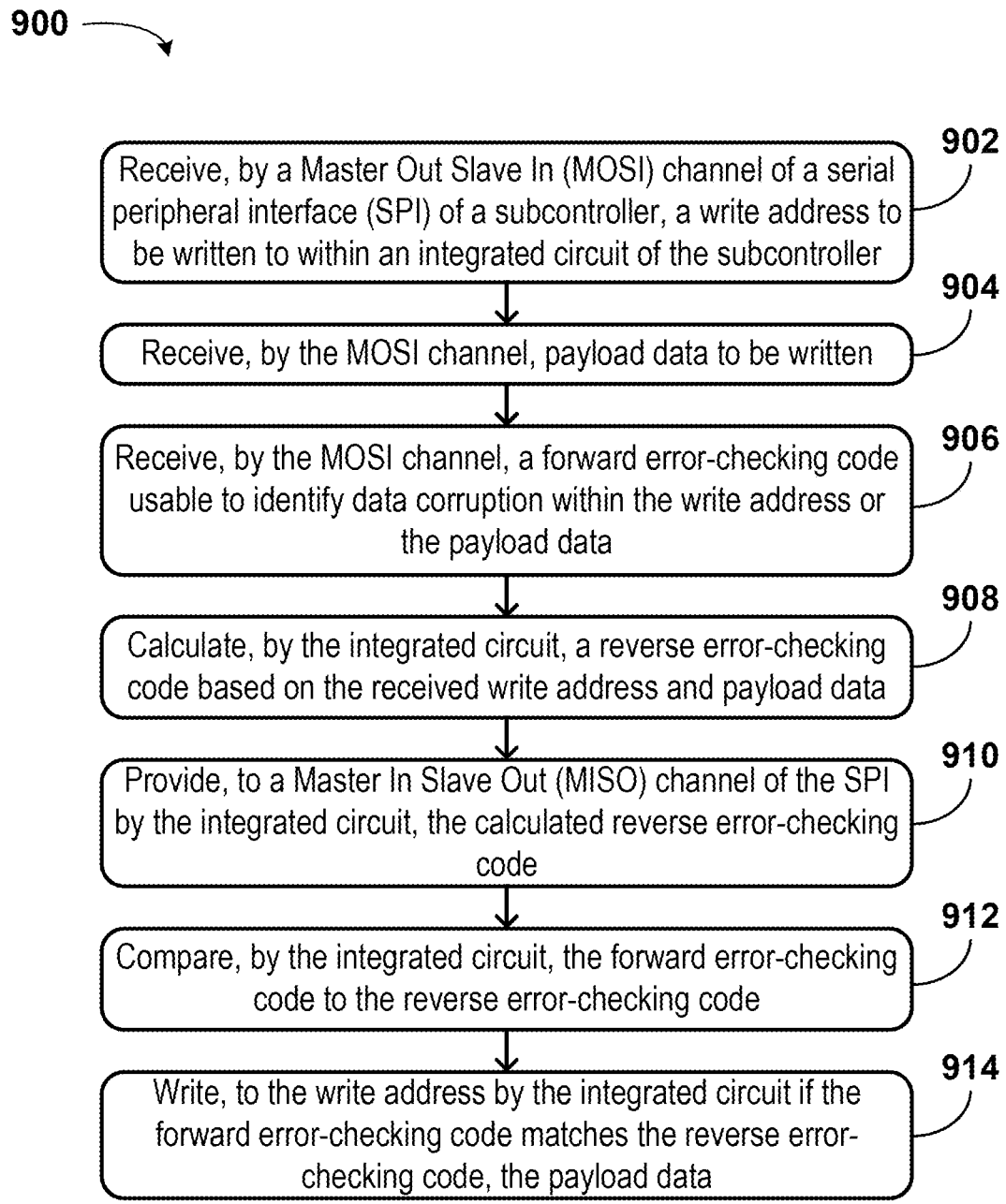
FIG. 9 is a flowchart illustration of a method, according to example embodiments.

FIG. 9 is a flowchart diagram of a method 900, according to example embodiments. The method 900 may be performed by a system (e.g., the system 500 illustrated in FIG. 5).

At block 902, the method 900 may include receiving, at a Master Out Slave In (MOSI) channel of a serial peripheral interface (SPI) of a subcontroller, a write address to be written to within an integrated circuit of the subcontroller.

At block 904, the method 900 may include receiving, by the MOSI channel, payload data to be written.

At block 906, the method 900 may include receiving, by the MOSI channel, a forward error-checking code usable to identify data corruption within the write address or the payload data. The forward error-checking code may be generated by a controller (e.g., the SPI controller 416 of the system 500 illustrated in FIG. 5) in order to identify errors in communications between the controller and the subcontroller.

At block 908, the method 900 may include calculating, by the integrated circuit, a reverse error-checking code based on the received write address and payload data. The reverse error-checking code may be usable to identify data corruption within the write address or the payload data.

At block 910, the method 900 may include providing, to a Master In Slave Out (MISO) channel of the SPI, the calculated reverse error-checking code.

At block 912, the method 900 may include comparing, by the integrated circuit, the forward error-checking code to the reverse error-checking code. For example, the integrated circuit may compare the forward error-checking code to the reverse error-checking code bitwise to determine whether each bit in the forward error-checking code matches each bit in the reverse error-checking code.

At block 914, the method 900 may include writing, to the write address by the integrated circuit if the forward error-checking code matches the reverse error-checking code, the payload data.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A device comprising:
an integrated circuit; and
a serial peripheral interface (SPI) communicatively coupled to the integrated circuit,
wherein the SPI comprises a Master In Slave Out (MISO) channel and a Master Out Slave In (MOSI) channel, and
wherein the integrated circuit is configured to:
provide, to the MOSI channel, a write address within a subcontroller to be written to;
provide, to the MOSI channel, payload data to be written;
provide, to the MOSI channel, a forward error-checking code usable to identify data corruption within the write address or the payload data;
receive, from the MISO channel, a reverse error-checking code calculated by the subcontroller based on the write address and the payload data, wherein the reverse error-checking code is usable to identify data corruption within the write address or the payload data;
compare the reverse error-checking code to the forward error-checking code to determine that a transmission error has occurred; and
initiate, in response to determining that the transmission error has occurred, appropriate remedial action.

2. The device of claim 1, wherein the appropriate remedial action comprises again:
providing, to the MOSI channel, the write address to be written to; and
providing, to the MOSI channel, the payload data to be written.

3. The device of claim 1, wherein the appropriate remedial action comprises providing, to the MOSI channel, only a portion of the payload data to be written.

4. The device of claim 1, wherein initiating the appropriate remedial action comprises initiating a repair or replacement of the device.

5. The device of claim 1, wherein initiating the appropriate remedial action comprises initiating a repair or replacement of the subcontroller.

6. The device of claim 1, wherein the appropriate remedial action comprises setting a flag indicating that the device, the subcontroller, an associated lidar device, an associated firing circuit, or associated light emitters are functioning improperly or require repair.

7. The device of claim 1, wherein the appropriate remedial action comprises decommissioning the device, the subcontroller, an associated lidar device, an associated firing circuit, or associated light emitters.

8. A method comprising:
providing, to a Master Out Slave In (MOSI) channel of a serial peripheral interface (SPI) of a controller, a write address within a subcontroller to be written to;
providing, to the MOSI channel, payload data to be written;
providing, to the MOSI channel, a forward error-checking code usable to identify data corruption within the write address or the payload data;
receiving, from a Master In Slave Out (MISO) channel of the SPI of the controller, a reverse error-checking code calculated by the subcontroller based on the write address and the payload data, wherein the reverse error-checking code is usable to identify data corruption within the write address or the payload data;
comparing the reverse error-checking code to the forward error-checking code to determine that a transmission error has occurred; and
initiating, in response to determining that the transmission error has occurred, appropriate remedial action.

9. The method of claim 8, wherein the appropriate remedial action comprises again:
providing, to the MOSI channel, the write address to be written to; and
providing, to the MOSI channel, the payload data to be written.

10. The method of claim 8, wherein the appropriate remedial action comprises providing, to the MOSI channel, only a portion of the payload data to be written.

11. The method of claim 8, wherein initiating the appropriate remedial action comprises initiating a repair or replacement of the controller.

12. The method of claim 8, wherein initiating the appropriate remedial action comprises initiating a repair or replacement of the subcontroller.

13. The method of claim 8, wherein the appropriate remedial action comprises setting a flag indicating that the controller, the subcontroller, an associated lidar device, an associated firing circuit, or associated light emitters are functioning improperly or require repair.

14. The method of claim 8, wherein the appropriate remedial action comprises decommissioning the controller, the subcontroller, an associated lidar device, an associated firing circuit, or associated light emitters.

15. A system comprising:
a subcontroller;
a controller comprising an integrated circuit, wherein the controller and the subcontroller are communicatively coupled over a serial peripheral interface (SPI) comprising a Master In Slave Out (MISO) channel and a Master Out Slave In (MOSI) channel, and
wherein the integrated circuit is configured to:
provide, to the MOSI channel, a write address within the subcontroller to be written to;
provide, to the MOSI channel, payload data to be written;
provide, to the MOSI channel, a forward error-checking code usable to identify data corruption within the write address or the payload data;
receive, from the MISO channel, a reverse error-checking code calculated by the subcontroller based on the write address and the payload data, wherein the reverse error-checking code is usable to identify data corruption within the write address or the payload data;
compare the reverse error-checking code to the forward error-checking code to determine that a transmission error has occurred; and
initiate, in response to determining that the transmission error has occurred, appropriate remedial action.

16. The system of claim 15, wherein the appropriate remedial action comprises again:
providing, to the MOSI channel, the write address to be written to; and
providing, to the MOSI channel, the payload data to be written.

17. The system of claim 15, wherein the appropriate remedial action comprises providing, to the MOSI channel, only a portion of the payload data to be written.

18. The system of claim 15, wherein initiating the appropriate remedial action comprises initiating a repair or replacement of the controller.

19. The system of claim 15, wherein initiating the appropriate remedial action comprises initiating a repair or replacement of the subcontroller.

20. The system of claim 15, wherein the appropriate remedial action comprises setting a flag indicating that the controller, the subcontroller, an associated lidar device, an associated firing circuit, or associated light emitters are functioning improperly or require repair.

* * * * *